(12) United States Patent
Yoshida

(10) Patent No.: US 8,235,651 B2
(45) Date of Patent: Aug. 7, 2012

(54) HORIZONTAL AXIS WIND TURBINE INCLUDING A ROTATING EXHAUST DUCT

(75) Inventor: Shigeo Yoshida, Tokyo (JP)

(73) Assignee: Fuji Jikogyo Kabushiki Kaisha, Tokyo (JP)

( * ) Notice: Subject to any disclaimer, the term of this patent is extended or adjusted under 35 U.S.C. 154(b) by 1161 days.

(21) Appl. No.: 12/061,970

(22) Filed: Apr. 3, 2008

(65) Prior Publication Data

US 2008/0247875 A1 Oct. 9, 2008

(30) Foreign Application Priority Data

Apr. 6, 2007 (JP) ................. 2007-100279

(51) Int. Cl.
*F01D 25/24* (2006.01)
*F03D 11/00* (2006.01)

(52) U.S. Cl. .......... 415/108; 415/4.5; 415/126; 415/908

(58) Field of Classification Search .............. 415/4.3, 415/4.5, 108, 126, 175, 176, 908
See application file for complete search history.

(56) References Cited

U.S. PATENT DOCUMENTS

| | | | |
|---|---|---|---|
| 2,509,797 A | 5/1950 | Barber | |
| 6,270,308 B1 * | 8/2001 | Groppel | 415/4.3 |
| 7,365,447 B2 * | 4/2008 | Yoshida | 290/55 |
| 7,427,814 B2 * | 9/2008 | Bagepalli et al. | 290/55 |
| 7,637,715 B2 * | 12/2009 | Battisti | 415/115 |

FOREIGN PATENT DOCUMENTS

| | | |
|---|---|---|
| DE | 720411 | 5/1942 |
| GB | 212739 | 3/1924 |
| JP | 58-065977 | 4/1983 |
| JP | 2001-526357 | 12/2001 |
| JP | 2002-013467 | 1/2002 |

OTHER PUBLICATIONS

Annex to the European Search Report dated Apr. 6, 2011, Application No. EP08153675, 1 page.

* cited by examiner

*Primary Examiner* — Edward Look
*Assistant Examiner* — Jason Davis
(74) *Attorney, Agent, or Firm* — Haynes and Boone, LLP

(57) ABSTRACT

The purpose of the invention is to protect, in a horizontal axis wind turbine with an exhaust aperture for exhausting air from within the nacelle, the exhaust aperture and the internal structures from storm winds through facing the exhaust aperture away from the storm wind, even when storm winds are received from all directions relative to the nacelle. A rotary duct is attached to the nacelle so as to be able to rotate freely in the yaw direction, and is rotated in the yaw direction in accordance with changes in the wind direction. The exhaust aperture is provided at a position that changes direction depending on the rotation of the rotary duct in the yaw direction. By rotating the rotary duct in the yaw direction so that the exhaust aperture will face the downwind side in accordance with changes in the wind direction, the exhaust aperture can be faced away from storm winds, even when storm winds are received from all directions in relation to the nacelle.

13 Claims, 3 Drawing Sheets

HORIZONTAL AXIS WIND TURBINE INCLUDING A ROTATING EXHAUST DUCT

CROSS REFERENCE TO RELATED APPLICATIONS

This application claims priority under 35 U.S.C. 119 based upon Japanese Patent Application Serial No. 2007-100279, filed on Apr. 6, 2007. The entire disclosure of the aforesaid application is incorporated herein by reference.

FIELD OF THE INVENTION

The present invention relates to a horizontal axis wind turbine, and in particular, relates to a nacelle exhaust aperture.

BACKGROUND

As is well known, so-called horizontal axis wind turbines are used broadly in wind-powered electric power generating equipment. Typically the horizontal axis wind turbine is structured comprising a rotor to which blades are attached radially from a hub, a nacelle wherein a rotor is supported rotatably through a main axis that extends in essentially the horizontal direction, to which the hub is attached, and a tower that supports the nacelle rotatably in the yaw direction, and which is disposed in essentially the vertical direction.

The nacelle contains heat-producing equipment requiring cooling, such as a step-up gear and an electric generator that are connected to the main axis. Because of this, the nacelle is provided with an air inlet aperture and an exhaust aperture within the structure to perform air-cooling on this equipment. In this case, the air that has absorbed heat from the heat-producing equipment is guided to the exhaust aperture and expelled to the outside of the nacelle, or a method is used wherein a radiator is equipped above the nacelle.

Patent documents 1 through 3 disclose horizontal axis wind turbines having air-cooled structures.

Patent document 1 (Japanese Unexamined Patent Application Publication S58-65977) discloses a horizontal axis wind turbine provided with an air inlet aperture on the bottom surface of the nacelle, and an exhaust aperture that is formed in the shape of a V, facing towards the outside, in the front surface end portion of the nacelle.

Patent document 2 (Japanese Unexamined Patent Application Publication 2001-526357) discloses a horizontal axis wind turbine wherein the electric generator is cooled through the provision of an air inlet aperture in the tower, and a gap in front of (on the blade side of) the electric generator.

On the other hand, patent document 3 (Japanese Unexamined Patent Application Publication 2002-13467) discloses a horizontal axis wind turbine wherein a fin is provided on the outside of the blade frame on the rear side.

In addition to the documents described above, in conventional horizontal axis wind turbines structures can be seen wherein exhaust apertures are open on the back end and side surfaces of the nacelle.

In conventional horizontal axis wind turbines, including those described in patent document 1 through 3, the positions of the air inlet aperture and of the exhaust aperture are fixed at a specific position relative to the nacelle.

In the normal horizontal axis wind turbine, yaw control is performed to control so as to face upwind, but it is necessary for the design to take into consideration times when there is a rapid change in the wind direction that cannot be followed through yaw control, or when there is a power stoppage or when the yaw system malfunctions, and to take into consideration storm winds coming from all directions.

When considering storm winds coming from all directions, in the case of the exhaust aperture being at a fixed position relative to the conventional nacelle, there will be cases when the storm wind is received in the exhaust aperture, and in such cases there will be an increased pressure within the exhaust aperture, and by extension, within the nacelle, which bears the risk of damaging or deforming the exhaust path, the surrounding structure, the equipment within the nacelle, and so forth. Conventional horizontal axis wind turbines are designed to protect against this, requiring high strengths, which is a factor that increases costs.

The present invention is a result of contemplation on the problem areas, described above, in the conventional technology, and the object thereof is to provide a horizontal axis wind turbine, provided with an exhaust aperture for exhausting the air within the nacelle, wherein the exhaust aperture can be faced away from the storm wind, even if there are storm winds from all directions relative to the nacelle.

SUMMARY

According to the first aspect of the present invention for solving the problem described above, there is provided a horizontal axis wind turbine having:

a turbine holding member;

a nacelle held by the turbine holding member such that the nacelle is rotatable in a yaw direction;

a main axis rotatably supported by the nacelle, having an extended portion extending essentially in a horizontal direction from the nacelle;

a rotor having a hub mounted to the extended portion of the main axis and a blade extending outwardly from the hub; and a rotary duct provided on a surface of the nacelle;

wherein the nacelle has a surface area with an opening, and the rotary duct is installed rotatably with respect to the nacelle and has an exhaust aperture in a position such that a direction at which the exhaust aperture faces changes as the rotary duct rotates, wherein the exhaust aperture is connected with an the inside of the nacelle via the opening.

According to the second aspect of the present invention for solving the problem described above, there is provided a horizontal axis wind turbine of the first aspect, wherein the rotary duct rotates according to a wind.

According to the third aspect of the present invention for solving the problem described above, there is provided a rotary duct rotates of the second aspect so as to cause the exhaust aperture to face in the downwind direction.

According to the fourth aspect of the present invention for solving the problem described above, there is provided a horizontal axis wind turbine of the second aspect, wherein the rotary duct has a tailfin.

According to the fifth aspect of the present invention for solving the problem described above, there is provided a horizontal axis wind turbine of the first aspect, wherein a rotation support member that supports the rotary duct rotatably with respect to the nacelle is provided on a peripheral portion of the opening on the nacelle.

According to the sixth aspect of the present invention for solving the problem described above, there is provided a horizontal axis wind turbine of the first aspect, further comprising an inner duct that connects between a heat producing portion within the nacelle and the opening of the nacelle.

According to the seventh aspect of the present invention for solving the problem described above, there is provided a horizontal axis wind turbine of the first aspect, wherein the rotary duct is supported rotatably in the yaw direction with respect to the nacelle.

According to the eighth aspect of the present invention for solving the problem described above, there is provided a horizontal axis wind turbine of the fourth aspect, wherein the exhaust aperture of the rotary duct and the tailfin of the rotary duct are provided on the same side with respect to a rotational center of the rotary duct with respect to the nacelle.

According to the ninth aspect of the present invention for solving the problem described above, there is provided a horizontal axis wind turbine of the first aspect, wherein the exhaust aperture of the rotary duct is open and faces slightly above the horizontal direction.

According to the tenth aspect of the present invention for solving the problem described above, there is provided a horizontal axis wind turbine of the first aspect, wherein the rotary duct is provided on a top upper surface of the nacelle.

According to the eleventh aspect of the present invention for solving the problem described above, there is provided a horizontal axis wind turbine of the second aspect, wherein the rotary duct is configured such that it rotates when a wind speed is greater than a specific wind speed.

According to the twelfth aspect of the present invention for solving the problem described above, there is provided a horizontal axis wind turbine of the first aspect, wherein the rotary duct is formed to extend lengthwise in one direction from a center of rotation of the rotary duct with respect to the nacelle.

According to the thirteenth aspect of the present invention for solving the problem described above, there is provided a horizontal axis wind turbine of the first aspect, wherein the rotary duct is formed to extend lengthwise in one direction from a center of rotation of the rotary duct with respect to the nacelle, and is provided with an exhaust aperture on an end section of the one direction, and the tailfin is formed along the lengthwise direction of the rotary duct.

According to the fourteenth aspect of the present invention for solving the problem described above, there is provided a horizontal axis wind turbine of the first aspect, wherein the rotary duct is teardrop shaped.

Given the present invention, the direction of the exhaust aperture that exhaust the air from within the nacelle can be changed to any directions relative to the nacelle through connecting, to the nacelle, a rotary duct wherein the exhaust aperture is provided at a position wherein the direction can be changed through yaw rotation relative to the nacelle.

Consequently, by rotating the rotary duct in the yaw direction so as to face the exhaust aperture towards the downwind side, through the force of the air, or the like, there is the effect of being able to face the exhaust aperture away from the storm wind even when storm winds are received from all directions relative to the nacelle.

DETAILED DESCRIPTION

An embodiment of the present invention will be described below in reference to the drawings. The below is one example of embodiment of the present invention, and does not limit the present invention.

Figure 1A:
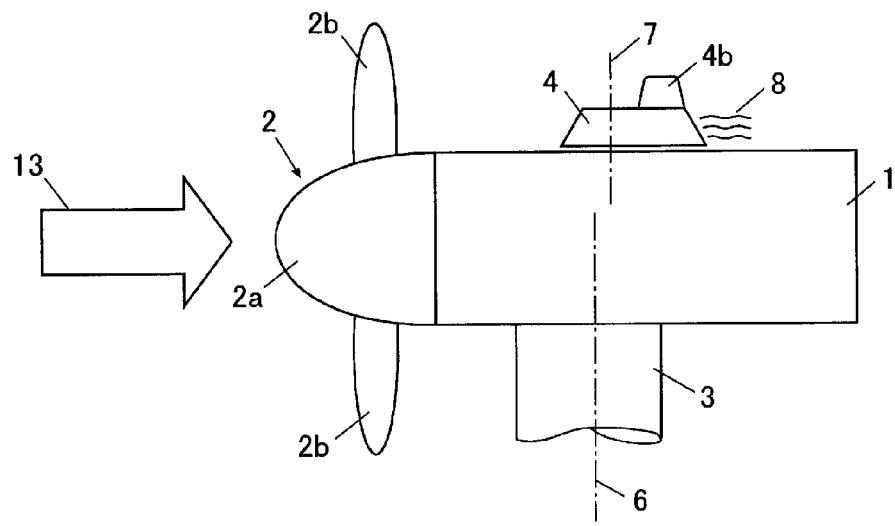
FIG. 1A is a side view and FIG. 1B a plan view of a horizontal axis wind turbine as set forth in one embodiment of the present invention.
Figure 1B:
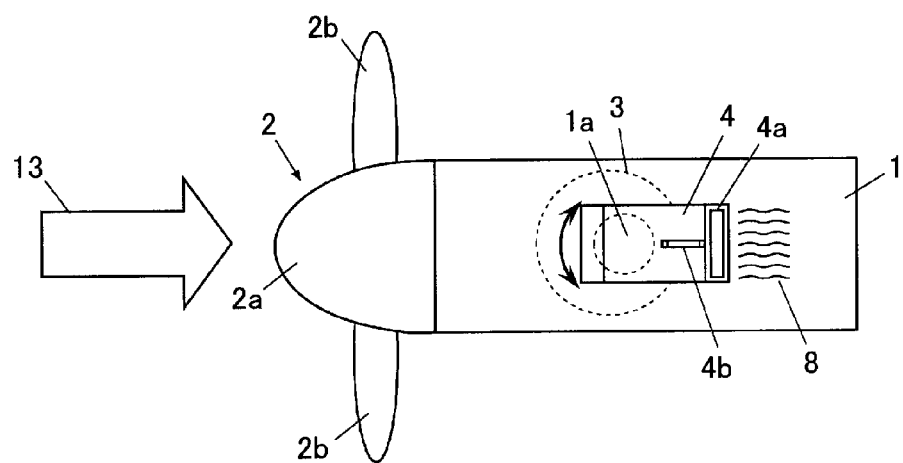
Figure 2:
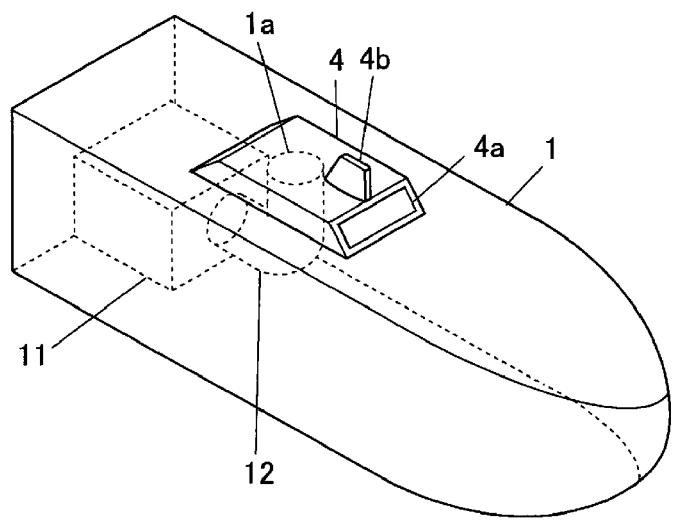
FIG. 2 is an oblique view illustrating schematically a nacelle as set forth in one embodiment of the present invention.
Figure 3A:
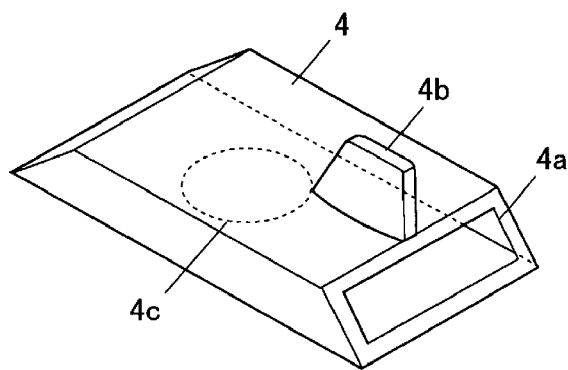
FIG. 3A is an oblique view and FIG. 3B a plan view of a rotary duct as set forth in one embodiment of the present invention.
Figure 3B:
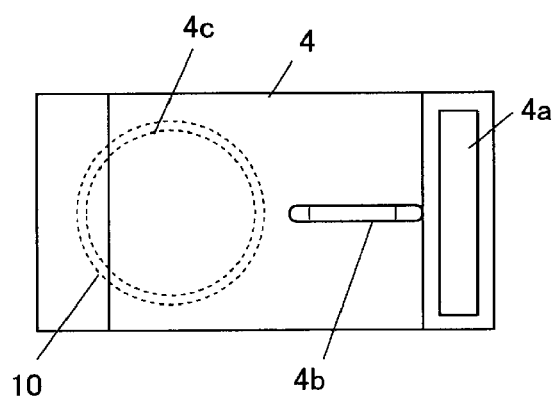

FIG. 1A is a side view and FIG. 1B is a plan view of a horizontal axis wind turbine as set forth in one embodiment of the present invention. FIG. 2 is an oblique view illustrating schematically a nacelle. FIG. 3A is an oblique view and FIG. 3B is a plan view of a rotary duct.

As is shown in FIG. 1A and FIG. 1B, the horizontal axis wind turbine of the present embodiment, as with a conventional horizontal axis wind turbine, is structured having a rotor 2, to which a blade 2b is attached to a hub 2a, a nacelle 1 which axially supports the rotor 2 through a main axis (not shown) that extends in essentially the horizontal direction, to which the hub 2a is attached, and a tower 3 which supports the nacelle 1 rotatably in the yaw direction, and which is disposed in essentially the vertical direction.

The horizontal axis wind turbine of the present embodiment is structured as a wind-powered electric generator device.

The horizontal axis wind turbine of the present invention further has structures such as the following.

As is shown in FIG. 1B, an opening 1a is provided on the top surface of the nacelle 1. A rotary duct 4 wherein an inlet aperture 4c is provided on the bottom surface, shown in FIG. 3, is attached to the nacelle 1. Along with the inlet aperture 4c, the rotary duct 4 is also provided with an exhaust aperture 4a that is continuous with the inlet aperture 4c, and a tailfin 4b.

The opening 1a and the inlet aperture 4c are connected so as to be aligned, and the inside of the nacelle 1 and the inside of the rotary duct 4 are connected.

The rotary duct 4 is attached rotatably in the yaw direction to the nacelle 1 through the rotation support member 10 shown in FIG. 3B. That is, the rotation support member 10 supports the rotary duct 4 so as to be able to rotate in the yaw direction relative to the nacelle 1. The rotation support member 10 is connected to a peripheral portion of the opening 1a and to a peripheral portion of the inlet aperture 4c, and the exhaust path 8 from the nacelle 1 to the rotary duct 4 is connected through the inside of the rotation support member 10.

As a shown in FIG. 2, an electric generator 11 that is driven by a rotor 2 is disposed within the nacelle 1. An inner duct 12 is also disposed within the nacelle 1. One end of the inner duct 12 is connected to the opening 1a. The other end of the inner duct 12 is connected to the electric generator 11.

Although the air inlet aperture to the nacelle 1 is not illustrated, it is equipped in an appropriate location below the nacelle 1, at the front end part of the nacelle 1, at a peripheral part of the tower (turbine holding member) 3, or the like. When the air inlet aperture is provided in the tower 3, the air that is drawn into the tower (turbine holding member) 3 moves upward within the tower 3 to enter into the nacelle 1.

The air that enters into the nacelle 1, either directly or through the tower (turbine holding member) 3, or the like, passes through the heat-generating portion of the electric generator 11, is heated by absorbing heat from the heat-generating portion, passes through the inner duct 12 and then through the rotary duct 4, and is exhausted from the exhaust aperture 4a of the rotary duct 4.

The air inlet structure is structured as described above. The rotary duct 4 will be described further.

In the present embodiment, as is shown in FIG. 1A, the yaw rotary axis 7 for the rotary duct 4 relative to the nacelle 1 is on the opposite side of the rotor 2 from the yaw rotary axis 6 for the nacelle 1 relative to the tower (turbine holding member) 3.

The rotary duct 4 is formed long in one direction in a radial direction from the yaw rotary axis 7, and the exhaust aperture 4a is disposed at the end surface of the end part that is formed furthest separated from the yaw rotary axis 7. The exhaust aperture 4a is open in the direction away from the yaw rotary axis 7. The exhaust aperture 4a is open facing slightly above the horizontal direction. Consequently, the direction of the exhaust aperture 4a changes when the rotary duct 4 rotates in the yaw direction.

The exhaust aperture 4a may be installed on a position that it can change the direction as the rotary duct 4 rotates in the yaw direction. If the surface on which the exhaust aperture 4a exists is not perpendicular relative to the yaw rotary axis 7, then the direction in which the exhaust aperture 4a faces will be changed by the rotation of the rotary duct 4 in the yaw direction.

Because the rotary duct 4 is formed so as to be long in one direction in a radial direction from the yaw rotary axis 7, when a wind of greater than a specific wind speed is received, the lengthwise direction will rotate so as to be parallel to the airflow, blowing the end part in which the exhaust aperture 4a disposed to the downwind side. The tailfin 4b, provided on the rotary duct 4, is disposed along the lengthwise direction of the rotary duct 4. Moreover, the tailfin 4b is disposed on the side, which is formed longer in the radial direction from the yaw rotary axis 7 of the rotary duct 4, wherein the exhaust aperture is disposed. The use of this structure can improve the apparent wind stability when the exhaust aperture 4c is blown to the downwind side.

Consequently, as is shown in FIGS. 1A and 1B, when a front-facing wind of at least a specific speed is received by the rotor 2, the rotary duct 4 will be stable with the end part in which the exhaust aperture 4a is provided facing the downwind side. At this time, the exhaust aperture 4a will face the downwind side.

Figure 4:
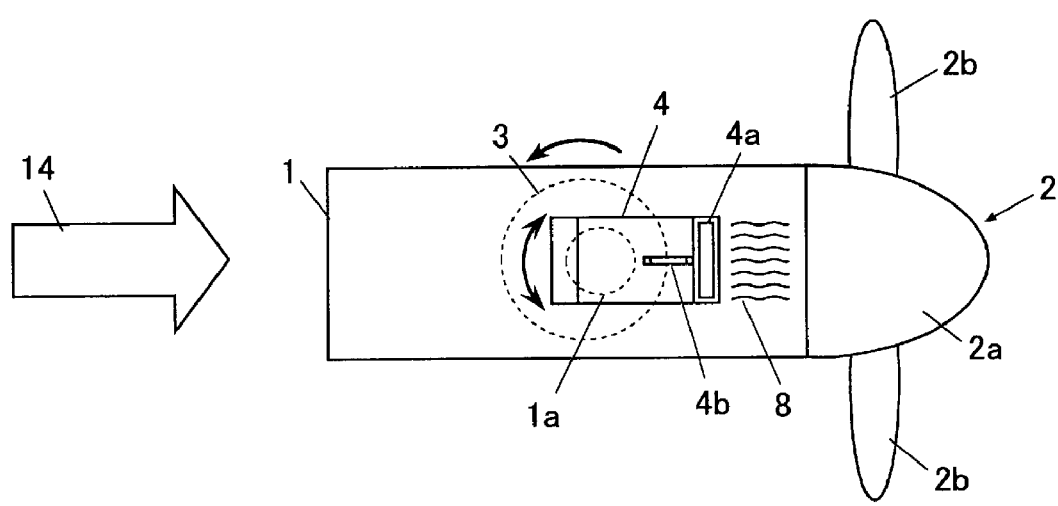
FIG. 4 is a plan view of a horizontal axis wind turbine as set forth in one embodiment of the present invention.

Moreover, as shown in FIG. 4, when a back-facing wind 14 of at least a specific speed is received by the rotor 2, the rotary duct 4 will be stable facing with the end part in which the exhaust aperture 4a is provided facing the downwind side. At this time, the exhaust aperture 4a will face the downwind side.

That is, the rotary duct 4 will rotate in the yaw direction, in conformance with changes in the direction of the wind that is received, so that the exhaust aperture 4a will face the downwind side.

In this way, given the rotation in the yaw direction of the rotary duct 4 so that the exhaust aperture 4a will face the downwind side, even if there are storm winds from all directions relative to the nacelle 1, the exhaust aperture 4a will be able to face away from the storm wind.

Notwithstanding the embodiment described above, it is discretionary whether or not the tailfin 4b is provided and the shape of the duct 4 is also discretionary. When the tailfin 4b is provided, all that is necessary is that the shape of the rotary duct 4, including the tailfin 4b, is designed so as to rotate in the yaw direction in conformance with changes in the wind direction for winds greater than a specific wind speed so that the exhaust aperture 4a will face the downwind direction; since there is a high degree of freedom in designing, variety of shapes can be applied. For example, the rotary duct 4 as a whole can be a streamlined shape, such as a teardrop shape. The specific wind speed may be set from the perspective of strength design. The rotary duct 4 need not be rotated in the yaw direction for weak winds of less than a specific wind speed, wherein the load is small. Moreover, the position of the rotary axis 7 for the rotary duct 4 may be changed as appropriate depending on the path of the air that passes through the heat-producing portions. In addition, although it is shown that the rotary duct 4 is disposed on top of the nacelle in the above embodiment, it is not limited to the position, and the rotary duct 4 can be disposed at a position that the exhaust aperture 4a will face the downwind side when a wind of greater than a specific wind speed is received. Furthermore, although it is shown that the nacelle 1 is disposed on top of the tower (turbine holding member) in the above embodiment, it is not limited to the position.

What is claimed is:

1. A horizontal axis wind turbine comprising:
   a turbine holding member;
   a nacelle held by the turbine holding member such that the nacelle is rotatable in a yaw direction;
   a main axis rotatably supported by said nacelle, having an extended portion extending essentially in a horizontal direction from the nacelle;
   a rotor having a hub mounted to said extended portion of the main axis and a blade extending outwardly from the hub; and
   a rotary duct provided on a surface of said nacelle;
   wherein
   said nacelle has a surface area with an opening, and
   said rotary duct is installed rotatably with respect to the nacelle and has an exhaust aperture in a position such that a direction at which the exhaust aperture faces changes as the rotary duct rotates,
   wherein said exhaust aperture is connected with an inside of the nacelle via said opening.

2. The horizontal axis wind turbine of claim 1, wherein said rotary duct rotates according to a wind.

3. The horizontal axis wind turbine of claim 2, wherein the rotary duct rotates so as to cause the exhaust aperture to face in the downwind direction.

4. The horizontal axis wind turbine of claim 2, wherein said rotary duct has a tailfin.

5. The horizontal axis wind turbine of claim 4, wherein the exhaust aperture of the rotary duct and the tailfin of the rotary duct are provided on the same side with respect to a rotational center of the rotary duct with respect to the nacelle.

6. The horizontal axis wind turbine of claim 4, wherein said rotary duct is formed to extend lengthwise in one direction from the center of rotation of the rotary duct with respect to the nacelle, and is provided with an exhaust aperture on an end section of said one direction, and said tailfin is formed along the lengthwise direction of the rotary duct.

7. The horizontal axis wind turbine of claim 2, wherein said rotary duct is configured such that it rotates when a wind speed is greater than a specific wind speed.

8. The horizontal axis wind turbine of claim 1, wherein a rotation support member that supports said rotary duct rotatably with respect to the nacelle is provided on a peripheral portion of said opening on the nacelle.

9. The horizontal axis wind turbine of claim 1, further comprising an inner duct that connects between a heat producing portion within the nacelle and said opening of the nacelle.

10. The horizontal axis wind turbine of claim 1, wherein said rotary duct is supported rotatably in the yaw direction with respect to the nacelle.

11. The horizontal axis wind turbine of claim 1, wherein the exhaust aperture of the rotary duct is open and faces slightly above the horizontal direction.

12. The horizontal axis wind turbine of claim 1, wherein said rotary duct is provided on a top upper surface of the nacelle.

13. The horizontal axis wind turbine of claim 1, wherein said rotary duct is formed to extend lengthwise in one direction from a center of rotation of the rotary duct with respect to the nacelle.

* * * * *